(12) United States Patent
Choquette et al.

(10) Patent No.: US 11,929,828 B2
(45) Date of Patent: Mar. 12, 2024

(54) SATELLITE SYSTEM OPTIMIZATION BY DIFFERENTIATING APPLICATION OF ADAPTIVE CODING AND MODULATION

(71) Applicant: Hughes Network Systems, LLC, Germantown, MD (US)

(72) Inventors: George Joseph Choquette, Potomac, MD (US); John Leonard Border, Middletown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/563,755

(22) Filed: Dec. 28, 2021

(65) Prior Publication Data
US 2023/0208552 A1 Jun. 29, 2023

(51) Int. Cl.
*H04L 1/00* (2006.01)
*H04B 7/185* (2006.01)
*H04L 47/12* (2022.01)

(52) U.S. Cl.
CPC ....... *H04L 1/0009* (2013.01); *H04B 7/18513* (2013.01); *H04L 47/12* (2013.01)

(58) Field of Classification Search
None
See application file for complete search history.

(56) References Cited

U.S. PATENT DOCUMENTS

| 8,660,006 | B2 * | 2/2014 | Torres | H04L 41/5022 370/468 |
| 2009/0060033 | A1 | 3/2009 | Kimmich et al. | |
| 2012/0287846 | A1 | 11/2012 | Becker et al. | |
| 2014/0045421 | A1 | 2/2014 | Miller | |
| 2014/0133306 | A1 * | 5/2014 | Park | H04L 47/27 370/235 |
| 2015/0351092 | A1 * | 12/2015 | Seo | H04W 72/21 370/329 |
| 2016/0072574 | A1 * | 3/2016 | Xu | H04B 7/18586 370/230 |
| 2017/0085411 | A1 * | 3/2017 | Noerpel | H04W 24/02 |
| 2017/0324468 | A1 * | 11/2017 | Lee | H04B 7/1858 |

(Continued)

OTHER PUBLICATIONS

"The International Search Report and the Written Opinion on PCT Application No. PCT/US2021/065379", dated Sep. 23, 2022, 16 pages.

*Primary Examiner* — Anh Vu H Ly
(74) *Attorney, Agent, or Firm* — MANNAVA & KANG, PC; George Y. Wang

(57) ABSTRACT

Systems and methods for differentiated application of an Adaptive Coding and Modulation (ACM) to enhance link performance in satellite communication systems are disclosed. A system may include a processor and a memory storing instructions, which when executed by the processor, cause the processor to dynamically compute bandwidth capacity of a terminal from a plurality of terminals. Based on the computed bandwidth capacity of the terminal, the processor may automatically determine a ModCod to be applied for transmission to or from the terminal to optimize bit error rate (BER) performance. The to processor may determine the ModCod using an ACM technique. For the plurality of terminals, the processor may dynamically determine aggregate bandwidth availability and congestion within the ACM technique to optimize sharing of available bandwidth.

19 Claims, 9 Drawing Sheets

(56) References Cited

U.S. PATENT DOCUMENTS

| | | | |
|---|---|---|---|
| 2018/0102949 A1* | 4/2018 | Smith | H04L 1/0003 |
| 2019/0044612 A1* | 2/2019 | Mundra | H04B 7/18543 |
| 2019/0132044 A1 | 5/2019 | Hreha et al. | |
| 2020/0107060 A1* | 4/2020 | Khan | H04W 72/542 |
| 2021/0367891 A1* | 11/2021 | Roy | H04L 47/125 |
| 2022/0131747 A1* | 4/2022 | Sevindik | H04L 1/08 |

* cited by examiner

400

| ModCod Reference 402 | ModCod Format 404 | ModCod Entry Threshold 406 | ModCod Exit Threshold 408 |
|---|---|---|---|
| 1 | QPSK ¼ | -1.4 | -1.8 |
| ... | Other rates not shown | ... | ... |
| 4 | QPSK ½ | 4.3 | 1.8 |
| ... | Other rates not shown | ... | ... |
| 6 | QPSK 2/3 | 4.7 | 3.7 |
| ... | Other rates not shown | ... | ... |
| 9 | QPSK 5/6 | 6.1 | 5.7 |
| ... | Other rates not shown | ... | ... |
| 12 | 8PSK 3/5 | 6.5 | 6.1 |
| ... | Other rates not shown | ... | ... |
| 18 | 16APSK 2/3 | 9.4 | 9.0 |
| ... | Other rates not shown | ... | ... |

| Symbol Rate (KSPS) 602 | ModCod Format 604 | Eligible? 606 | Min threshold 608 | Target 610 |
|---|---|---|---|---|
| 512 | QPSK 1/2 | Y | 3 | 3.8 |
| 512 | Other rates not shown | ... | ... | ... |
| 512 | QPSK 2/3 | Y | 4.8 | 5.6 |
| 512 | Other rates not shown | ... | ... | ... |
| 512 | 8PSK ½ | Y | 6.2 | 7 |
| 512 | Other rates not shown | ... | ... | ... |
| 512 | QPSK 9/10 | Y | 8.1 | 8.9 |
| 512 | Other rates not shown | ... | ... | ... |
| 512 | 16APSK 2/3 | Y | 10.7 | 11.5 |
| 512 | Other rates not shown | ... | ... | ... |
| 512 | 8PSK 8/9 | Y | 12.5 | 13.2 |
| 512 | Other rates not shown | ... | ... | ... |
| 512 | 16APSK 9/10 | N | 14.4 | 15.2 |
| 512 | Other rates not shown | ... | ... | ... |
| 1024 | Other rates not shown | ... | ... | ... |
| Other rates not shown | Other rates not shown | ... | ... | ... |

FIG. 6

SATELLITE SYSTEM OPTIMIZATION BY DIFFERENTIATING APPLICATION OF ADAPTIVE CODING AND MODULATION

TECHNICAL FIELD

This patent application is directed to satellite communication systems and, more specifically, to systems and methods for differentiated application of Adaptive Coding and Modulation (ACM) to enhance link performance in satellite communication systems.

BACKGROUND

Adaptive Coding and Modulation (ACM) is a technique for optimizing performance of a link channel for satellite systems, by using an efficient modulation and Forward Error Correction (FEC) code combination (ModCod) for each terminal. However, link channels pertaining to multiple terminals may be associated with varying link conditions due to static and/or dynamic factors such as, for example, sizing/configuration of equipment, traffic congestion, weather, and other such factors. For example, transmission to one terminal may be subject to relatively worse link conditions than another terminal. Conventional ACM implementation may not consider these factors, thus leading to poor link quality or unoptimized bit error rate (BER) performance for such terminals.

In addition, the conventional ACM implementation may treat the terminals independently of each other. This may also lead to inefficient usage of bandwidth capacity of each link channel, especially in case of link channels with relatively lesser traffic. Further, the traditional ACM technique may not consider aspects such as variable demand and affordability of service, thus lacking customized service levels based on requirements of an end user. Furthermore, even for a particular terminal, the link transmission may need varying level of robustness or spectral efficiency of the transmission depending on type/class of traffic. Additionally, the conventional implementation may also lack provisions for an opportunistic downgrade of forward/return link to a more robust ModCod in case of available capacity, thus leading to inefficient ACM technique.

BRIEF DESCRIPTION OF DRAWINGS

Features of the systems and methods are illustrated by way of example and not limited in the following Figure(s), in which like numerals indicate like elements, in which:

FIG. 4 illustrates an example of a partially configured trajectory table pertaining to ACM forward link, according to an example;

FIG. 6 illustrates an example of a configured trajectory table for a return link path of a terminal, according to an example;

DETAILED DESCRIPTION

Figure 1A:
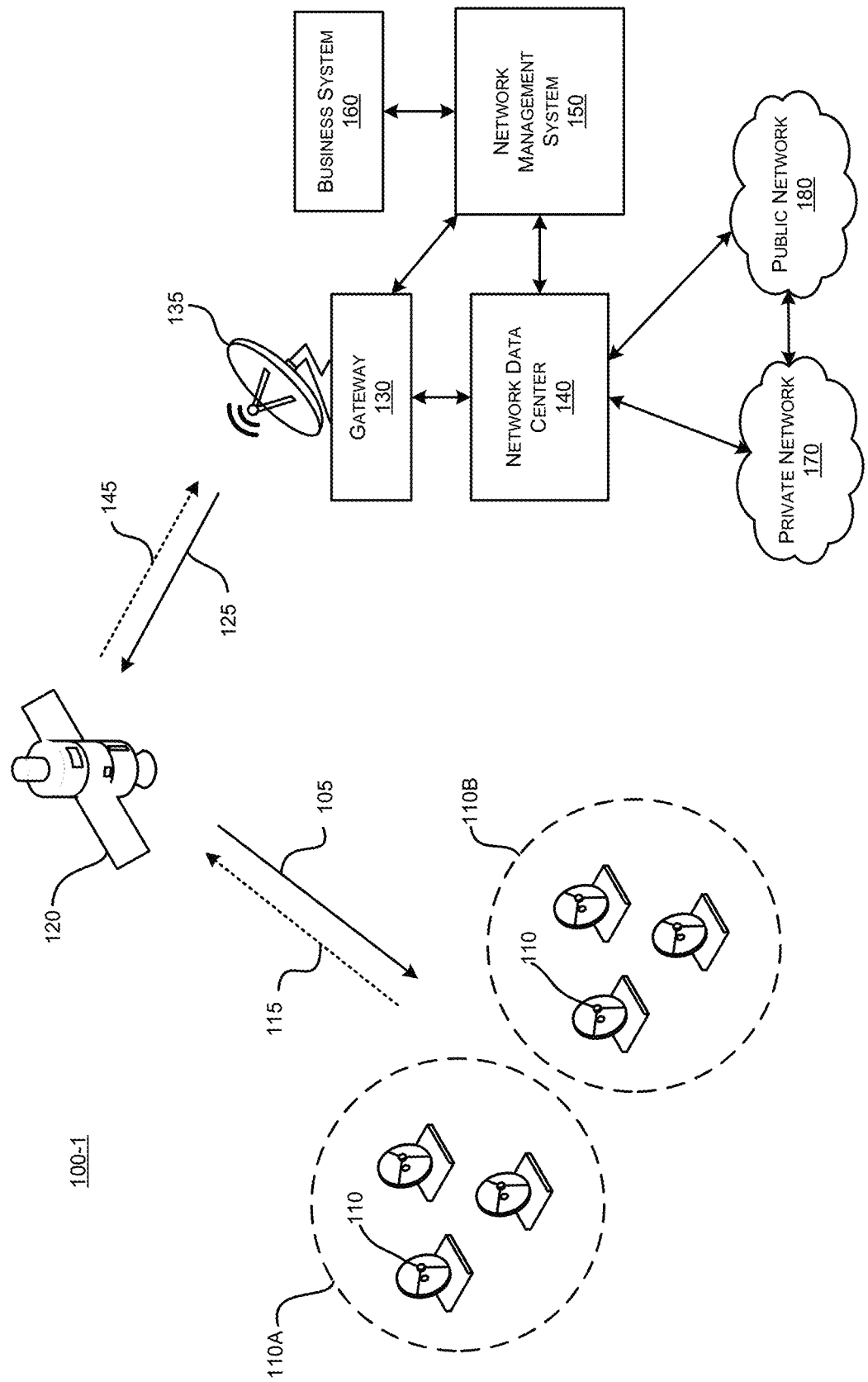
FIG. 1A illustrates a system for differentiating application of ACM to enhance link performance in satellite communication systems, according to an example.

For simplicity and illustrative purposes, the present systems and methods are described by referring mainly to examples and embodiments thereof. In the following description, numerous specific details are set forth in order to provide a thorough understanding of the systems and methods described herein. It will be readily apparent, however, that the systems and methods may be practiced without limitation to these specific details. In other instances, some methods and structures readily understood by one of ordinary skill in the art have not been described in detail so as not to unnecessarily obscure the systems and methods described herein. As used herein, the terms "a" and "an" are intended to denote at least one of a particular element, the term "includes" means includes but not limited to, the term "including" means including but not limited to, and the term "based on" means based at least in part on.

As described above, Adaptive Coding and Modulation (ACM) may be used to optimize link performance for terminals, by using most efficient modulation and forward error correction (FEC) code combination (hereinafter also referred to as "ModCod") for each user terminal. The modulation and FEC code combination may be implemented in the form of ModCod, which may achieve a target link quality at pre-defined link conditions. The link conditions pertaining to any of the forward link or the return link may be affected by static and/or dynamic factors. For example, the static factors may include, for example, sizing and performance of gateway device, terminal device and/or terminal, and other pre-defined static factors. The dynamic factors may include, for example, weather attenuation or interference on uplink and/or downlink and other variable factors. Further, out of a plurality of terminals, each terminal may have variable dynamic factors that may lead to variable transmission, even in case of similar ACM implementation. For example, transmission to one terminal may be subject to relatively worse weather conditions than another terminal, thus requiring variable implementation of ACM. This implementation of ACM may compensate for variable conditions (or dynamic factors) with more robust modulation and/or coding during transmission.

The systems and methods may also utilize the ACM to maximize the capacity efficiency for bandwidth used by each given user terminal, while optimizing target bit error rate (BER) performance for the particular user terminal. The term BER may pertain to number of bit errors per unit time. The BER may be in uniformity with satellite link conditions (such as weather attenuation) affecting the particular user terminal. The present technique may implement ACM in a manner to determine specific ModCod to be used for transmission to and/or from the particular user terminal to optimize the BER performance. The systems and methods described herein may consider the fact that implementation of highly robust ModCods may utilize bandwidth at lower bits per symbol (bps) efficiency than do less robust ModCods. Therefore, the terminals using robust ModCods (highly robust) may consume more shared system capacity than terminals using more spectrally efficient ModCods (less robust), to convey same amount of end user traffic. Thus, unlike conventional ACM, the systems and methods described herein, recognizes that each link/traffic may not be equivalent. Therefore, the system can differentiate one terminal from a second terminal based on any or a combination of aspects, such as for example, congestion parameters, or availability of a service level defined for the respective terminals.

Specifically, the systems and methods described herein, may also enable differentiating ACM treatment either between terminals, or between different traffic classes within given terminals. This may be performed in one or more ways. In some examples, the system may enable to dynamically determine aggregate bandwidth availability and congestion within the ACM technique to optimize sharing of available bandwidth for a plurality of terminals. The systems and methods described herein, may also facilitate opportunistic downgrade to a more robust forward ModCod and/or return ModCod when capacity is available, to minimize BER. In some examples, the systems and methods described herein, may recognize that ACM can be adjusted opportunistically for certain traffic classes during periods of low system congestion or when bandwidth is otherwise available. In some examples, systems and methods described herein, may facilitate adaptive use of different ACM trajectory tables at a given site, based on various system metrics and controls. Furthermore, for an optimized BER performance, the systems and methods described herein may facilitate automatic manipulation of forward control traffic ModCod based on utilization or efficiency thresholds, and other such aspects. Several other crucial aspects will be described in detail herein.

As described herein, the term "link condition" may refer to a set of static and/or dynamic factors that may affect integrity of signals transmitted to and/or from a terminal. The term "link quality" may refer to an error metric for the link. For example, "link quality" may be referred to in terms of average uncoded BER or average packet error rate (PER). In another example, the term "link quality" may also be correlated to a link quality metric that can be measured by a receiver, such as signal-to-noise ratio (SNR) and other such metrics. The usage of terms such as "more efficient ModCod" may refer to delivery of higher units of uncoded bits/symbol. In this usage, the term "more efficient" may be used interchangeably with the term "less robust". The use of the terms "more robust ModCod" may refer to delivery of an increased code protection per uncoded bit. Similarly, the term "less efficient" may be used interchangeably with the term "more robust". Additionally, the term "higher ModCod" may be used herein to refer to a more efficient ModCod, and the term "lower ModCod" may be used here to refer to a less efficient ModCod.

FIG. 1A illustrates a system 100-1 for differentiating application of ACM to enhance link performance in satellite communication systems, according to an example. In some examples, the system 100-1 may depict a satellite communication system capable of providing at least voice and/or data services. In some examples, the satellite communication may be a transponded satellite that relays a shared forward channel transmission signal from a gateway 130 to at least one terminal 110. The system 100-1 may include any number of terminals 110, a satellite 120, the gateway 130, a network data center 140, a network management system (NMS) 150, a business system 160, or other various system elements or components. The system 100-1 may also include a private network 170 and/or public network 180. It should be appreciated that the system 100-1 depicted in FIG. 1A may be an example. Thus, the system 100-1 may or may not include additional features and some of the features described herein may be removed and/or modified without departing from the scopes of the system 100-1 outlined herein.

The terminals 110 may be any variety of terminals. For example, the terminals 110 may be customer terminals, such as very small aperture terminals (VSATs). It should be appreciated that VSATs may be terminals that are mounted on a structure, habitat, or other object or location. Depending on application, the terminals 110 may include or incorporate any number of antenna dishes, which may be provided in various sizes, depths, or dimensions (e.g., small, medium, large, etc.). Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. That said, there may be scenarios where the terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (I).

As shown in FIG. 1A, there may be different types of terminals or a plurality of groups of terminals 110 (e.g., customer VSATs). For example, each terminal such as 110A, 1106 (collectively referred to as terminal or terminals 100) may be pertain to an individual terminal or plurality of groups. In some examples, the terminal 110A may be terminal(s) that involve relatively better conditions than the terminal(s) 1106. For example, weather conditions may be relatively better in transmission to and/or from the terminals in case of terminal(s) 110A than terminal(s) 1106. The satellite 120 may be an object intentionally placed into orbit. In some examples, the satellite 120 may be an artificial satellite that is configured to transmit and receive data signals. For example, the satellite 120 may form one or more beams and provide connectivity between at least the terminals 110 and the gateway 130. More specifically, the satellite 120 may communicate data signals using these beams with the terminals 110 via a terminal return channel 115 and a terminal forward channel 105, and with the gateway 130 via a gateway return channel 145 and a gateway forward channel 125. It should be appreciated that the satellite 120 may form any number of beams and channels to communicate data signals with any number of components, even beyond the terminals 110 or the gateway 130 as shown.

In some examples, the satellite 120 may be a communication satellite, which may be in geosynchronous (GEO) orbit, low earth orbit (LEO) or mid earth orbit (MEO) satellite. The link conditions may vary more rapidly for LEO and MEO systems as the propagation path may be longer or shorter depending on the satellite location and different atmospheric/weather conditions encountered.

In some examples, the satellite 120 may include, but not limited to, a transponded satellite, a regenerative satellite, and/or other similar satellite that implement ACM for forward and/return signal carriers. In case of regenerative satellite, ACM adaptive controls applicable to the gateway 130 might may instead be performed by the satellite 120, or might be performed by the satellite 120 under control of the gateway 130 or some other ground system. Furthermore, in some examples, the satellite 120 may operate in geosynchronous, mid-earth, low-earth, elliptical, or some other orbital configuration.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to/from the public internet 180 and/or private network 170 across the satellite communication channels 115, 105, 125, or 145 to/from any terminal 110, which would then provide data communications or route traffic to/from any customer premise equipment (CPE) (not shown) associated with the terminal 110. Although depicted as a single element, the gateway 130 may include a single gateway, multiple gateways residing locally or remotely, in full or in part, relative to the other system components. As described in more detail below, the gateway 130, the network data center 140, and/or the network management system (NMS) 150 may provide operations associated with the system for determination of ModCod in differentiating ACM application.

The system may include a processor (e.g., a computer processing unit (CPU), etc.), a data store and other such elements. In some examples, the system may be implemented in the gateway 130. The processor may include also various configurations including, without limitations, a personal computer, laptop, server, and other elements. The data store may be used, for example, to store and provide access to information pertaining to various operations of and in the system 100-1 or 100-2. Although depicted as a single element, the processor and/or the data store may be configured as a single element, multiple elements, or an array of elements. For example, the gateway 130 may include any number of processors and/or data stores in order to accommodate the needs of a particular system implementation. Various examples may further provide for redundant paths for components of the gateway 130. These redundant paths may be associated with backup components capable of being seamlessly or quickly switched in the event of a failure or critical fault of any primary component.

Referring to FIG. 1A, the network data center 140 may be communicatively coupled to the gateway 130, as well as other system components, such as the network management system (NMS) 150, private network 170, and/or public network 180. In some examples, the network data center 140 may be a satellite network data center that is configured to perform ACM based functions. In some examples, the network data center 140 may include a plurality of network data centers that are local or remote, in full or in part, relative to the other system components.

The network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150 in order to perform the differentiated application of ACM to enhance link performance. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100-1 as well as any external element or system connected to the private network 170 and/or public network 180. The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they are communicatively coupled. The private network 170 and/or public network 180 may facilitate transmission of data according to a transmission protocol of any of the devices and/or systems in the private network 170 and/or public network 180. Although each of the private network 170 and/or public network 180 is depicted as a single network in FIG. 1, it should be appreciated that in some examples, each of the private network 170 and/or public network 180 may include a plurality of interconnected networks as well.

Figure 1B:
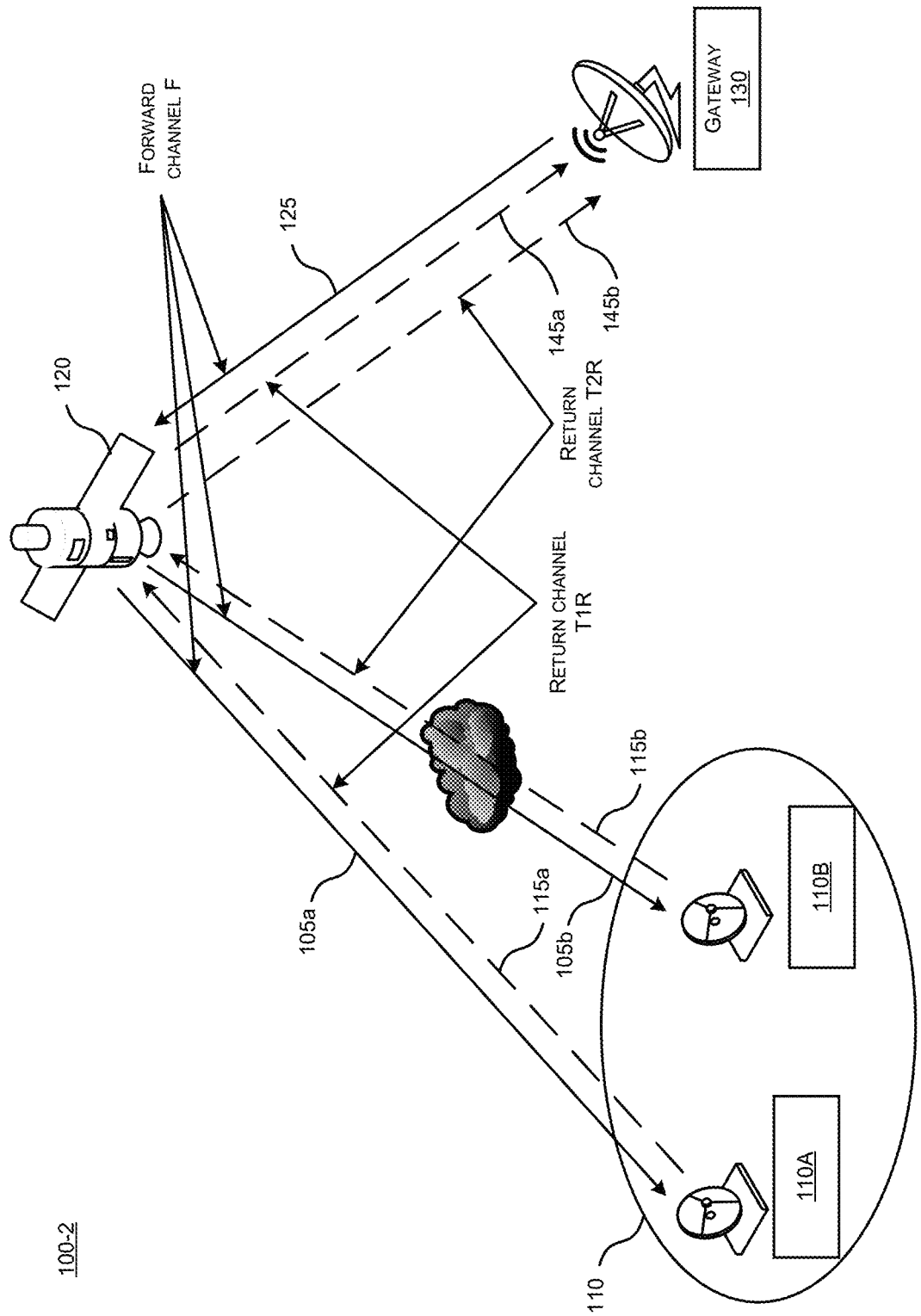
FIG. 1B illustrates a typical/conventional system for implementing ACM.

FIG. 1B illustrates a typical/conventional system 100-2 for implementing ACM. As shown, FIG. 1B is provided to exemplify variable conditions/parameters pertaining transmission to and/or from the terminals 110A, 110B that may be required to be considered to optimize BER performance. As depicted in FIG. 1B, in a conventional ACM implementation, the satellite 120 may relay a forward channel transmission signal F (125, 105a, 105b) from the gateway 130 to terminals 110A and 110B. The forward channel F may include uplink signal path 125 from gateway 130 to the satellite 120, and downlink signal paths 105a and 105b from the satellite 120 to terminals 110A and 110B respectively. The path of the forward channel may be based on connectivity and/or translation of the uplink signal path and the downlink signal paths. The terminals 110A and 110B also include return signal paths i.e. TR1 and TR2 respectively that are transmitted through satellite 120 to the gateway 130. The terminal 110A may transmit return channel T1R via uplink path 115a to the satellite 120, which might transpond this signal into downlink path 145a. The terminal 110B may transmit return channel T2R via uplink path 115b to the satellite 120, which might transpond this signal into downlink path 145b. As depicted in FIG. 1B, terminals 110A and 110B may be positioned at different locations that are subject to varying weather conditions and interference in their respective downlink paths (105a and 105b) and/or uplink paths (115a and 115b) from and/or to the satellite 120. For example, the downlink path 105b may be subjected to cloudy weather conditions than 105a, and/or the uplink path 115b may be subjected to cloudy weather conditions than 115a. This may cause difference in quality of downlink and/or uplink signal paths for the respective shared forward channel F and/or return channel (TR1/TR2). One of the major limitations of conventional ACM is that the terminals are treated independently, irrespective of the corresponding link conditions.

The system and method described herein (in FIG. 1A), effectively addresses these issues based on differentiated application of ACM. The system of FIG. 1A may include a memory operatively coupled with a processor. Upon execution of a set of instructions, the processor may dynamically compute bandwidth capacity of a terminal for the plurality of terminals. Based on the computed bandwidth capacity of the terminal and using ACM technique, the processor may automatically determine a Modulation and Coding combination (ModCod). The ModCod may be applied for transmission to and/or from the terminal, which may optimize bit error rate (BER) performance. In some examples, the system may be a dynamic link adaptation system. In some examples, the system may be implemented in the gateway 130 (or a gateway device).

Referring back to FIG. 1A, for the plurality of terminals 110 (or plurality of terminals), system or processor may dynamically determine aggregate bandwidth availability and congestion within the ACM technique to optimize sharing of available bandwidth. For example, the forward channel transmission signal F may be a forward shared carrier that may carry/transmit data to be received by multiple terminals 110. This is a significant improvement over conventional ACM implementation that may treat the terminals independently, which may lead to wastage in bandwidth capacity usage.

In some examples, using the system and method described herein, the ACM technique may use a trajectory table to adaptively change and/or allow permission for use of the applied ModCod by the terminal. The configuration of the trajectory table may be altered based on capacity utilization and expected congestion during the day. In some examples, the trajectory table may authorize use of a given ModCod format for a defined traffic class of service for the terminal. Various other aspects pertaining to the trajectory table will be clear in light of examples discussed herein. In some examples, using the system and method described herein, the applied ModCod may be changed based on monitoring and periodic comparison of shared forward channel aggregate utilization with a pre-defined threshold. The change may include downgrading the ModCod when the shared forward channel aggregate utilization is less than the pre-defined threshold. In other words, "downgrading" the mod ModCod may refer to less efficient functionality, so in this example, if the forward channel is empty, the terminal might be authorized to use a less efficient ModCod, but when the forward channel is congested the terminal might not be permitted to use such a ModCod.

In an example embodiment, using the system and method described herein, applied ModCod may be changed for the terminal based on any or a combination of parameters associated with at least one of satellite link, congestion, weather, availability of a service level to be provided to the terminal, terminal radio power, or antenna size. The parameters may pertain to various static and/or dynamic factors that may lead to differential parameters for terminals 110A and 110B. For example, the forward channel transmission signal F for terminal 110A (or 110B) may be affected by static/constant factors such as, for example, sizing and performance of the gateway 130, terminal 110A (or 110B) and/or satellite 120. Further, as shown in FIG. 1B, the forward channel transmission signal F for terminal 110A (or 110B) may be affected by dynamic factors such as weather attenuation, interference on uplink signal path 125 and/or interference on downlink signal path (105a, 105b). Similarly, the return channel TR1 and/or TR2 for terminal 110A (or 110B) may be affected by static/constant factors such as, for example, sizing and performance of the gateway 130, terminal 110A (or 110B) and/or satellite 120. Further, as shown in FIG. 1B, the return channel TR1 and/or TR2 for terminal 110A (or 110B) may be affected by dynamic factors such as weather attenuation, interference on uplink signal path (115a, 115b) and/or interference on downlink signal path (145a, 145b). As depicted in FIG. 1B, the return uplink path 115b of terminal 110B may be subjected to different weather conditions (cloudy weather) than the return uplink path 115a of terminal 110A.

To address this, the system and method described herein may enable to apply a differentiating ACM in such a way that the applied ModCod may be changed for the terminal 110B to compensate for varying conditions with more robust modulation and/or coding to ensure the transmitted data from terminal 110B is received correctly by the gateway 130. In some examples, one terminal may be differentiated from a second terminal based on any or a combination of congestion parameters, and availability of a service level defined for the respective terminals. In some example, the differentiating ACM may be implemented by applied ModCod, such that through ACM the gateway 130 may be enabled to optimize respective forward transmission carrier F individually for each of the multiple terminals 110 receiving the shared carrier. The resultant waveform may be designed to include successive codeblocks. In an example, each codeblock may be modulated and coded to optimize link quality to adapt to the link conditions of respective terminals to which data in that codeblock is addressed. The return channels T1R and T2R each carry return traffic for each respective terminal 110A and 110B respectively, and ACM optimization of transmission for the return links may consider link conditions of the respective terminal. In an example, the forward link transmission F or return link transmission (TR1, TR2), successive codeblocks or transmissions may be modulated and/or coded differently, to be optimized for terminals experiencing different or changing link conditions. For example, for forward link transmission to a respective terminal (110A or 110B), corresponding codeblocks containing broadcast or multicast data may be sent using a ModCod that is sufficiently robust for the link conditions applicable to the respective terminals. In another example, forward codeblocks containing system control messages destined to all terminals 110 (including terminals for which link conditions are unknown to the gateway 130) may be sent using a relatively more robust ModCod. It should be appreciated that the mentioned examples may be applicable to the adaptive waveform defined by standard pertaining to digital video broadcasting—satellite second generation (DVB-S2), but may also be applicable to other forward and return path waveforms with adaptive properties, in any case of being standardized or proprietary. The examples disclosed herein may pertain to multiple aspects of ACM optimization. For example, the ACM optimization may be applied independently or in combination for a given channel used by the terminals 110, wherein the terminal 110 might be associated with a single forward channel, or different forward channels over time. Similarly, a terminal may use a single return channel, or might use different return channels over time, and ACM optimization may be applied to independently adapt to conditions of each link while in use. In some examples, specific classes of terminals may simultaneously receive multiple forward channels from the same or different satellites, and might simultaneously transmit multiple return channels to the same or different satellites.

Figure 2:
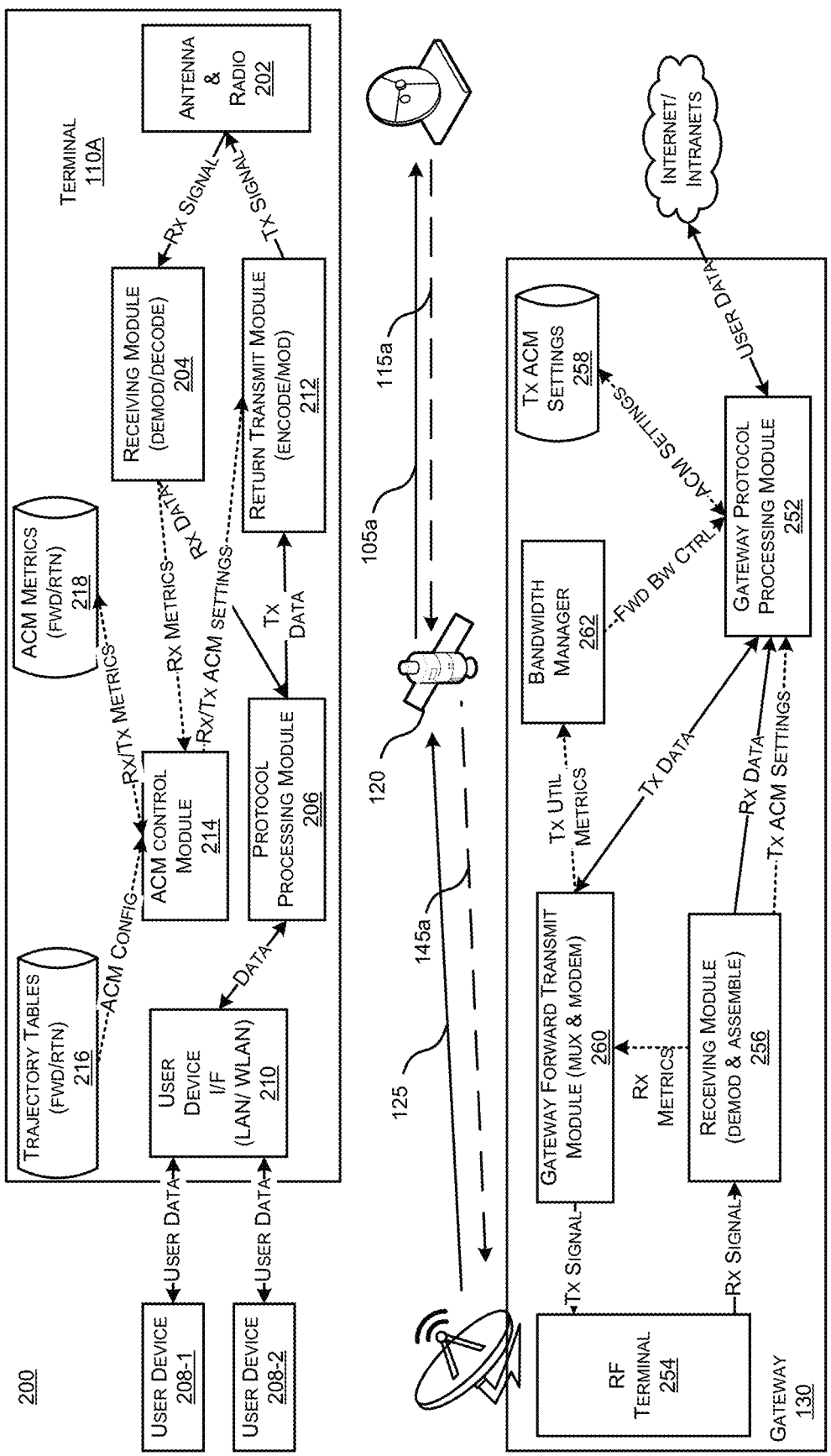
FIG. 2 illustrates system elements/interactions pertaining to differentiating ACM implementation by system of FIGS. 1A-1B, according to an example.

FIG. 2 illustrates system elements/interactions pertaining to differentiating ACM implementation (corresponding to FIG. 1A), according to an example. As per an example described in FIG. 2, terminal 110A may receive shared forward channel 125 from gateway 130 that is relayed via satellite 120 (through 105a). The shared forward channel 125 may forward the transmission/data from the satellite 120 to the terminal 110A (through 105a), which is received by an antenna 202. The terminal 110A may include various modules to extract and/or process the received transmission data, control signaling addressed to the terminal and/or various other functions. In an example, the received data may be forwarded to a protocol processing module 206, and further sent to an appropriate user device 210 and/or with external user devices (208-1, 208-2, and other user devices). If applicable, the received data may be subjected to decoding at receiving module 204, prior to sending to the protocol processing module 206. In an example, the protocol processing module 206 may perform optimizing functions. The protocol processing module 206 of terminal 110A may receive data from the user device 210 via local area network (LAN) or wireless LAN (WLAN) interface. The received user data may be queued for transmission to the satellite 120 by the return transmit module 212. The terminal 110A may transmit the received user data and/or control signaling on a return channel 115a that is relayed via satellite 120 to the gateway 130, as shown in FIG. 2. In an example, the gateway 120 may receive the transmitted data from satellite 120 via the radiofrequency (RF) terminal 254. The gateway 130 may extract/process the user data, using a gateway protocol processing module 252, and may forward the user data to external networks, performing protocol processing functions and/or optimizing as required.

In an example and as depicted in FIG. 2, the terminal 110A may control operation/implementation of ACM for forward link 105a and/or return link 115a. The receiving module 204 of the terminal 110A may measure quality of the forward link signal 105a, and may provide metrics for the signal quality to an ACM control module 214. The ACM control module 214 may perform averaging/hysteresis processing based on pre-defined (previous measurements) and current metrics to filter out transient effects. In an example, configured trajectory table 216 may be used by ACM technique to adaptively change and/or allow permission for use of the applied ModCod by the terminal 110A. Thus, the ACM control module 214 may use the configured trajectory table 216 to determine the applied ModCod (forward ModCod/ACM settings) that should be implemented by the gateway 130 for sending data to the terminal 110A. The ACM control module 214 may store the ACM settings at storage 218 and may relay this information pertaining to the forward ModCod (ACM settings) to the gateway 130 through the return transmit module 212. For example, the information pertaining to the forward ModCod may be relayed, for example, in the form of piggybacked on data packets or in the form of dedicated message(s). The RF terminal 254 of the gateway 130 may receive and share the received information pertaining to the forward ModCod, which may be relayed to the receiving module 256 and further to the gateway protocol processing module 252. The gateway protocol processing module 252 may store the information and/or the corresponding ACM settings pertaining to terminal 110A in ACM settings storage 258. In the next phase, the gateway protocol processing module 252 sends a forward user data to gateway forward transmit module 260, wherein the module 252 indicates the ModCod to be used based on the saved ACM settings for terminal 110A. The gateway forward transmit module 260 may encode the forward user data in codeblocks using the indicated ACM/ModCod settings. This may enable a closed loop for forward ACM under supervision of the ACM control module 214 of the terminal 110A, wherein the ACM control settings may be consistent with the configured trajectory table 216. It should be appreciated that the ACM control module 214 may not be necessarily be present in the terminal 110A but may be alternatively configured in the gateway 130. In an example, the terminal 110A may relay metrics for the signal quality of the forward link to the gateway 130 that may use a local forward link trajectory table to decide the appropriate forward ModCod for terminal 110A. In an alternate example, the gateway may include a forward receiving module that may maintain ACM settings for each terminal, rather than the gateway protocol processing module 252. The gateway my also include a bandwidth manager 262 to check/manage the bandwidth capacity. It should be appreciated that the bandwidth manager 262 may have a number of different functions. In some examples, the bandwidth manager 262 may monitor aggregate utilization of forward capacity and inform the protocol processing module 252 of the rate at which data can be supplied to the forward transmit module 260 without overrunning that module (either in an absolute value or with a speed up/slow down control). In some examples, the bandwidth manager 262 may also monitor utilization of that capacity by different virtual network operators and indicate, based on how much capacity they have paid for, how much traffic the protocol processing module 252 is permitted to supply for each. In other words, the bandwidth manager 262 may provide controls whether certain classes of terminals, or terminals with certain service plan subscriptions, or certain priorities of traffic destined to those terminals, are permitted to use certain inefficient ModCods based on current aggregate forward capacity utilization. Several other configurations for deriving/implementing the ACM settings may be possible. It may also be appreciated that the above described implementation may also be applied to return link of the terminal 110A. In that case, the ACM control module 214 may also determine a transmit power level adjustment, based on processed return link signal quality metrics, and may determine to make a power adjustment in addition to or in lieu of a ModCod adjustment. This provides for closed loop ACM operation on the return link, under supervision of the ACM control module 214, and as per the configured trajectory table 216. In this example, the ACM control may be applicable when a return channel is a dedicated channel operating a waveform such as DVB-S2, or is a shared time division multiple access (TDMA) channel with dedicated time slot allocations.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100-1, system component 200, and their components, as shown in FIGS. 1A and 2.

Figure 3:
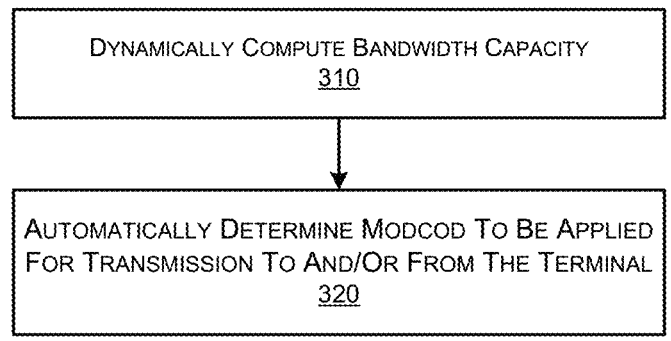
FIG. 3 illustrates a method for differentiating application of ACM to enhance link performance in satellite communication systems, according to an example.

FIG. 3 illustrates a method for differentiating application of ACM to enhance link performance in satellite communication systems, according to an example. The method 300 is provided by way of example, as there may be a variety of ways to carry out the method described herein. Although the method 300 is primarily described as being performed by the system 100-1 of FIG. 1A and/or the system component 200 of FIG. 2, the method 300 may be executed or otherwise performed by one or more processing components of another system or a combination of systems. Each block shown in FIG. 3 may further represent one or more processes, methods, or subroutines, and one or more of the blocks may include machine readable instructions stored on a non-transitory computer readable medium and executed by a processor or other type of processing circuit to perform one or more operations described herein. The system 100-1 or system component 200, for example, may assess the need for differentiating application of ACM based on requirement such as based on a request from terminals or in predetermined regular intervals during normal system operations. In some examples, this may be an automated sequence of actions, as described below and shown in FIG. 3.

At 310, a bandwidth capacity of a terminal may be dynamically computed. In an example, the bandwidth capacity may be computed at a network device, such as, for example a gateway. At 320, ModCod that needs to be applied for transmission to and/or from the terminal may be automatically determined based on the computed bandwidth capacity of the terminal and using the ACM technique. The applied ModCod may optimize bit error rate (BER) performance. In an example, the ModCod may be determined at the network device. In some examples, the network device may dynamically determine aggregate bandwidth availability and congestion within the ACM technique to optimize sharing of available bandwidth for the plurality of terminals. The ACM technique may use a trajectory table to adaptively change and/or allow permission for use of the applied ModCod by the terminal.

Although the method 300 may be continuous or automatic, it should be appreciated that the method 300 may be suspended at any time, based on operator command or automatically by the NMS 150 during certain extraordinary operations, such as major maintenance or upgrade activity or for other reasons. Details for each of these actions will not be described in greater detail below.

In an example, the trajectory table may enable to identify configuration parameters that control selection of applied ModCod (ACM ModCod) based on processed forward and/or return link signal quality metrics. In some examples, the configuration of the trajectory table may be altered based on capacity utilization and expected congestion during the day. FIG. 4 illustrates an example of a configured trajectory table 400 pertaining to partial ACM forward link, according to an example. It should be appreciated that the configured trajectory table 400 may be subset of trajectory table entries, wherein a complete trajectory table may include sufficient ModCod steps to dynamically optimize link quality and throughput, through ModCod entries. The ModCod entries may include additional modulation and coding combinations in between the entries shown in FIG. 4. In an example, the configured trajectory table 400 may include a ModCod reference number 402. The ModCod reference number 402 may be relayed from terminal 110 to inform gateway 130 and may pertain to type of ModCod that should be used for forward data and control signaling sent to the terminal. The configured trajectory table 400 may also include a ModCod format 404 indicating the modulation and coding to be applied for a given reference number. Further, the configured trajectory table 400 may include a ModCod entry threshold 406, indicating a first signal quality metric value that should be reached or exceeded for the terminal 110 to consider a given ModCod as eligible for operation. In an example, the signal quality metric value may include signal to noise ratio (SNR) or other such metrics, such as bit error rate (BER). Further, the configured trajectory table 400 may include a ModCod exit threshold 408, indicating a second signal quality metric value at which terminal 110 may no longer consider the given ModCod as eligible for operation. Based on the configured trajectory table 400, the ACM control module of the terminal (such as 214 in FIG. 2) may select the most efficient ModCod for the forward path for which the terminal meets the entry threshold. For example, for the entries shown in FIG. 4, a terminal with a signal quality metric value of 5.0 may qualify to use ModCod 6 (QPSK ⅔), ModCod 4 (QPSK ½) and ModCod 1 (QPSK ¼), but may not qualify for using ModCod 9 (QPSK ⅚), ModCod 12 (8 PSK ⅗) or ModCod 18 (16 apsk ⅔), or any other ModCod not shown with entry threshold value greater than 5.0. In this case, the most efficient ModCod may be ModCod 6, providing for QPSK modulation (2 bits per symbol) and ⅔ FEC (2 data bits for every 3 coded bits), giving 4/3 data bits per symbol. In some examples, the trajectory table 400 may be ordered/customized by increasing efficiency to simplify selection algorithm/technique. The range between entry threshold and exit threshold may be used to overcome toggling between ModCods when signal quality may be near a threshold. In an example, when signal quality metric may drop below the entry threshold of the currently selected ModCod, but may exceed the exit threshold configured for that ModCod, the terminal may continue to use the ModCod. In an alternate example, when the signal quality metric may drop below the entry threshold of the currently selected ModCod, and further drops below the exit threshold configured for that ModCod, the ACM control module may determine that ModCod is no longer eligible for use. In this example, the ACM control module may consider only more robust (and less efficient) ModCods for which the metric value may qualify.

In an example, the system/processor may downgrade the applied ModCod for a codeblock transmission by changing an encoding pattern of packets in the codeblock when forward channel capacity is available so as to minimize the BER. For example, the gateway 130 may transmit data to terminal 110 using a forward link ACM ModCod that may be more robust than requested by the terminal 110. This may be performed to maximize capacity efficiency of a shared forward channel.

It should be appreciated that there may be several operating states within the configured trajectory table 400. In some examples, the terminal 110A may drop down to a lower (less efficient/more robust) operating state, e.g., in the event the measured metric drops below the ModCod exit threshold for that operating state. In this case, the terminal 110A may pick the trajectory table entry for which its measured metric is above the entry threshold. It should be appreciated that the terms "above" and "below," as used herein, are relative terms. For example, in the event signal-to-noise ratio (SNR) is used, use of "above" and "below" may be proper. However, in the event BER metric is used, then use of "above" and "below" may be reversed or backwards. For BER, for instance a higher bit error rate may be worse and a lower bit error rate may be better, which is the opposite for signal-to-noise ratio (SNR). In some examples, the terminal may move up to a higher (more efficient/less robust) operating state (e.g., the measured metric goes above the ModCod entry threshold for a more efficient ModCod table entry—the terminal may pick the best ModCod at which it qualifies). In some examples, the terminal may also remain at its current operating state (e.g., previous ModCod) where neither of the above-mentioned criteria are met.

Figure 5:
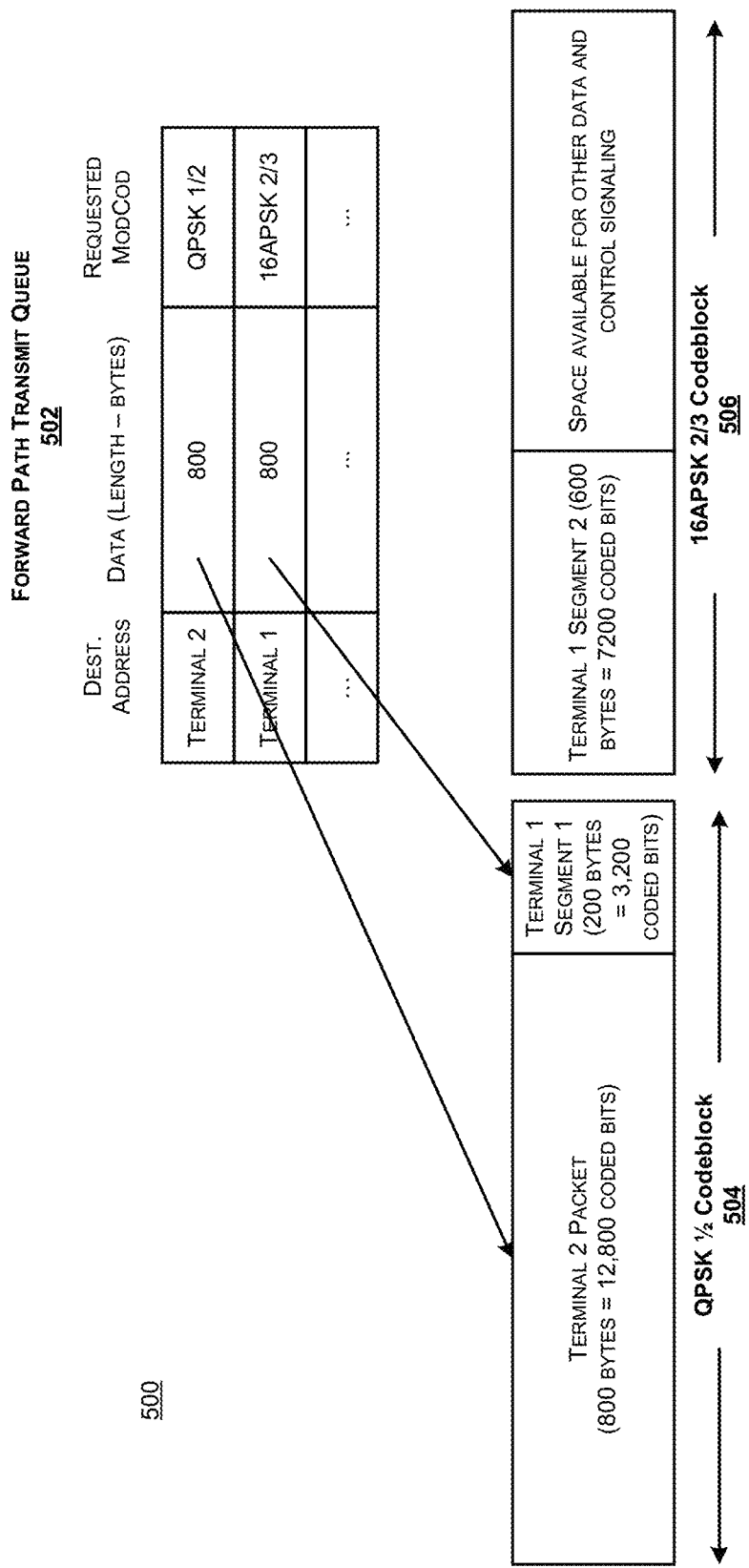
FIG. 5 illustrates a block diagram showing downgrade in terminal ModCod on a shared forward channel, according to an example.

FIG. 5 illustrates a block diagram showing downgrade in terminal ModCod for enhancing efficiency on a shared forward channel, according to an example. As depicted in FIG. 5, an 800-byte data packet may be queued in gateway forward transmit module to be sent to a terminal 2, followed by an 800-byte data packet to be sent to terminal 1. In this example, a terminal 2 may have requested ModCod as QPSK ½, and a terminal 1 may have requested ModCod 16APSK ⅔. Based on an assumption that a 16,000-bit codeblock may be used for the forward channel, and that the 800-byte data packet of terminal 2 contains 6,400 bits to be transmitted, at QPSK ½, the terminal 2 data packet may occupy 12,800 bits of the 16,000 bit codeblock (two coded bits per one data bit). This may lead to an availability of 3,200 bits. In this specific example, the 800-byte data packet of terminal 1 may as well contain 6,400 bits to be transmitted, but with a 16APSK ⅔ ModCod. The system may opt for one of the following solutions. As a solution, the system may leave the 3,200 available bits in the QPSK ½ codeblock unoccupied, and may start a new 16APSK ⅔ codeblock to hold the entire packet of terminal 1, wherein at ⅔ FEC the 800-byte data packet of the terminal 1 may occupy 9,600 bits of the 16,000 bit 16APSK ⅔ codeblock capacity. However, as an alternate solution, and as shown in FIG. 5, the system may segment the 800-byte data packet of the terminal 1 such that 200 bytes (1600 bits) may be coded in the QPSK ½ (3,200 coded bits) to complete the QPSK ½ codeblock, while the second part or 600 bytes of data packet of the terminal 1 may be coded in 16APSK ⅔ codeblock (7200 coded bits), leaving 8,800 codeblock bits free for other data or control signaling. At the respective terminal 1, the two parts of the 800-byte data packet may be reassembled for processing. This solution is more efficient as it enables to fully utilize available codeblock space.

In an example, return link ACM operation of terminal (shown in FIG. 2) may also be guided by a trajectory table. While the trajectory table for return link may be analogous to a forward trajectory table (as shown in FIG. 4) in some applications, there may be additional factors which might be considered in the ACM trajectory construction. For example, the factors may include transmit power capability of the terminal radio, return channel symbol rate, and a target receive power level (at the gateway) for a given ModCod and symbol rate combination. The transmit power capability of the terminal radio may enable to determine or constrain symbol rates and/or ModCod combinations that the terminal may be eligible to use such that the terminal may not transmit at a rate that requires more than the maximum limit of radio power. In some examples, a ranging process may be used during and/or after terminal commissioning to establish this eligibility. The terminal may transmit a signal using a given ModCod at a given symbol rate and the gateway may measure and return a signal quality metric of the received signal to the terminal. Based on the signal quality metric, the terminal may adjust transmit power to achieve a target receive signal quality metric value at the gateway for corresponding return link. In some examples, when more than the available radio power may be required to reach a desired target value, the combination of symbol rate and ModCod may not be eligible for the terminal to use. In some examples, when the terminal may be eligible to use a given symbol rate and ModCod combination, the ranging process may establish an initial transmit power setting for that combination from which open or closed loop transmit power control algorithms/technique for terminal return link may start upon application of the ModCod. Thus, the return link ACM trajectory table may be constructed from a combination of configured target metric values and values derived from ranging. Several other methods may be used to configure or construct return link ACM trajectory table.

FIG. 6 illustrates an example of a configured trajectory table 600 for a return link path of a terminal, according to an example. The table 600 indicates application of the additional factors, as described hereinabove and includes trajectory for each return link symbol rate supported by the terminal 110. In an example, the return link ACM trajectory table may be sorted by symbol rate, as might be applicable. For example, this may be applicable in examples wherein gateway 130 may assign the symbol rate (based on prior terminal ranging results) and the terminal controls the corresponding ACM operation within the assigned rate. In an alternate example, the return link ACM trajectory table may be sorted by relative efficiency or robustness across symbol rate and ModCod combinations, using specific normalizing metric such as threshold carrier to noise ratio (C/No).

As shown in table 600, each entry may pertain to a given symbol rate 602 and may include a ModCod format 604 indicating the modulation and coding to be applied. The table 600 may also include an eligibility 606 of a terminal to use the corresponding symbol rate and ModCod format combination. In an example, the eligibility may be derived by a ranging process, by configuration, or based on other aspects. For example, the other aspects may include a temporary disqualified state of a terminal for a specific combination (symbol rate and ModCod format) that may have led to a high error rate as per historical data. The table 600 may include a minimum metric value (or threshold) 608 that may be required to be attained for a terminal to use the symbol rate and ModCod format combination. For example, the minimum metric value or threshold 608 value may be SNR value or other such metrics. In some examples, when the terminal may not be able to maintain the minimum metric value or threshold 608 at maximum transmit power, the ACM control module of the terminal may apply a more robust ModCod. The table 600 may include a target metric value 610 to which the terminal uplink power control may control transmit power. To enable this, the terminal may reduce transmit power when it exceeds the target metric value 610, or may increase transmit power when lesser than the target metric value 610, up to the maximum radio transmit power level. The return link based trajectory table may not be limited to the mentioned aspects and may also include other information, for example, a starting transmit power level for a ranged and eligible ModCod for a given symbol rate. In some examples, the ACM control module may select the most efficient ModCod for a return link path for which the terminal may meet the minimum threshold value, and may use uplink power control feedback to attain the target value. In an example, the terminal may continue to use a ModCod if above the minimum threshold, even if unable to reach the target value (due to being capped by maximum radio transmit power). In another example, if the terminal may be unable to attain the minimum threshold value for a symbol rate and ModCod combination when at maximum transmit power, the ACM control module may apply more robust ModCod for which the minimum threshold value may be attained. Several other aspects of ACM implementation may be applicable.

The system and method described herein, may thus enable to execute different modes of ACM implementation, based on requirements/condition, as will be described further as different examples. It should be appreciated that although the below mentioned c/examples are explained for system including satellite networks, terminals and gateways, however, the implementation may also be applicable for wireless terrestrial networks that use dynamic link adaptation, varying modulation or coding to optimize conditions and capacity for each wireless terminal (for example, a smart phone). The modes of implementing ACM by the present system/method are discussed in detail herein and below in form of examples/scenarios.

Scenario 1: Differentiation of ACM Trajectory Tables Between Otherwise Similarly Provisioned Sites In an example, the system and method described herein, may enable to differentiate a terminal from a second terminal based on any or a combination of congestion parameters, and availability of a service level defined for the respective terminals. Thus, the ACM optimized transmission may be performed on an individual terminal basis to the link conditions being experienced by each given terminal. In some examples, the trajectory table may facilitate guidance pertaining to the available transmission formats based on signal metrics reported by the receiving side of the link signal. The conventional methods may rely on using a common/similar trajectory table configuration for a similar terminal (modem, radio and antenna) configuration and expected satellite link. However, as system operators may sell different grades of service availability (referred herein as the "service level") to different customers, the use of a common/similar trajectory table may not be effective.

For example, assuming similar link conditions (or weather conditions) for two terminals 1 and 2, the terminal site (for example, terminal 1) may be used by a user to support mission critical or high value public safety, government or enterprise traffic, and other such crucial businesses that may require high service availability, for example 99.9% corresponding to high service charges. In contrast to this, there may be other users/terminals (for example, the terminal 2) that may require a lower service availability and also a lower service cost, such as, for example, an Internet access home terminal user. To address such varying demand (service availability), the conventional techniques may differentiate service by providing higher cost equipment (larger antennas, more power radios), to high availability customers than to lower availability customers. However, the system and method described herein, employ differentiated ACM trajectory tables to differentiate availability, with or without implementation of differentiated equipment configurations. This may facilitate to achieve varying service availability (service level) for different type of terminals/users.

For example, in reference to FIG. 4, for terminal (terminal 1), the ACM forward trajectory table may be configured such that that use of ModCod1, QPSK ¼, as well as ModCod 4, QPSK ½, and other more efficient ModCods may be permitted. However, for the other terminal (terminal 2), the ACM forward trajectory table may be configured such that the use of ModCod1 is not permitted, but rather applies ModCod 4, QPSK ½, as its most robust (and least efficient) format. In an example, in case of rain attenuation at terminal 1, the corresponding ACM control module may request gateway to apply ModCod 1, using 4 coded bits to deliver each user data bit on the forward channel. In this case, terminal 2 may request no more than 2 coded bits to deliver each user data bit. In case of rainy conditions (pertaining to terminal 1 a terminal 2), the corresponding ACM control module of terminal 1 may enable use of twice as much forward channel capacity to receive comparable traffic to terminal 2. In this case, the terminal 2 may lose service while the terminal 1 forward link may continue to operate, assuming equivalent rain conditions. It should be appreciated that various other factors may be considered in differentiating ACM for various types of terminals. Further, differentiation may also be used for the return link trajectory table in a similar manner as described for forward link trajectory table. The differentiation for return link trajectory table may be augmented or replaced with eligibility of high availability sites to utilize additional and limited lower symbol rate return capacity (for example, symbol rate of 256 ksps). For example, link with symbol rate of 256 ksps for high availability site may be maintained with greater rain attenuation than standard availability site (having 512 ksps link), given the same terminal radio power and antenna size.

Scenario 2: Adaptive Use of Different ACM Trajectory Tables at a Given Site, Based on Various System Metrics and Controls In an example, using the system and method described herein, an applied ModCod may be changed based on monitoring and periodic comparison of shared forward channel aggregate utilization with a pre-defined threshold. The change may include downgrading the ModCod when the shared forward channel aggregate utilization is greater than the pre-defined threshold. For example, a terminal (Term 1) may be configured with an ACM forward trajectory table that enables a highly robust ModCod to be requested, for example, QPSK ¼. Another terminal (Term 2) may be configured with an ACM forward trajectory table that also enables QPSK ¼ to be requested, but only while the shared forward channel aggregate utilization is below a given threshold, for example 85%. In this example, the Term 2 may obtain the utilization either by monitoring the forward channel or from system information that may broadcast on the forward channel from the gateway. In some examples, the monitoring may be performed by counting symbols used for traffic versus null codeblocks or null-padding in codeblocks. In this example, the Term 1 may continue to be provided with the highest availability possible for its link conditions, while the Term 2 may be provided with that same highest availability during less congestion and with a standard availability in duration of congestion.

It should be appreciated that this congestion-based differentiation may also be applied for the terminal return link (similar to the forward link). In examples pertaining to the return link, the Term2 may be constrained to use some combinations depending on return bandwidth capacity (in aggregate, or for a given symbol rate) as advertised by the gateway in an alternate example, the system and method described herein, may enable to differentiate service availability using different trajectory table configurations, which may be augmented by considering current system capacity utilization. The configuration of the trajectory table may be altered based on capacity utilization and expected congestion during the day. In this example, specific ACM trajectory table entries may be configured for use during pre-defined time of day, for example during typical off-peak periods. For example, the standard availability for the Term 2 may be authorized to request QPSK ¼ on the forward channel only between 1 am and 8 am. Thus, availability (via capacity efficiency) may be differentiated based on expected congestion times rather than on actual congestion status. The above mentioned provisions may enable intermediate service availability (and service charges) in addition to high and standard service availability plans.

Scenario 3: Application of Different ACM Trajectory Tables for Different Traffic Classes In some examples, the trajectory table may authorize use of given ModCod format for a defined traffic class of service for the terminal. This means that the configured ACM trajectory table may enable authorized usage of a given ModCod format only for a given traffic class of service for the given terminal. For example, the defined traffic class may enable to define high priority based services requiring high service availability (such as mission critical traffic) such as, for example conversational voice, security monitoring, point-of-sale or order entry transaction data at a business location. Other traffic class pertaining to inventory data uploads, training video downloads or guest Wi-Fi Internet access service may be considered as lower-priority or lower-value traffic. For example, referring to example trajectory tables 400 and 600 in FIGS. 4 and 6 respectively, certain ModCod entries may be restricted to defined traffic class of service i.e. services having high-priority. Thus, only the high priority based services/traffic may be eligible to use capacity less efficiently than low value traffic. Hence the lower value traffic may be dropped at the gateway or terminal prior to transmission.

It should be appreciated that the above mentioned examples of high and low priority traffic may vary based on the terminal/user requirements/preferences. In some examples, the defined traffic class of service may be determined by the terminal and/or gateway using conventional configured multi-field classification rules, differentiated services code point (DSCP) values, or deep packet inspection techniques. In some examples, for a given terminal, the corresponding ACM control function may indicate a different requested ModCod/ModCod format to the gateway for different traffic classes. The differentiated treatment of traffic classes using ACM may be combined with adaptive use of different trajectory tables based on congestion or time of day. For example, a user such as an enterprise may be provided with high service availability times for mission critical traffic, irrespective of channel congestion. In this case, the trajectory table configuration may indicate that mission critical traffic may be transported using a highly robust ACM ModCod when indicated by link conditions, for any channel loading level or time of day.

In some examples, the ACM trajectory table configuration may be configured to indicate that lower value traffic classes may be formatted using a highly robust ACM ModCod if needed only during low congestion conditions (i.e., based on current channel loading or time of day), and not during high congestion conditions. The configuration may indicate a more efficient ModCod as the lowest eligible for these traffic classes during high congestion conditions. It should be appreciated that the traffic class based differentiated ACM may be extended beyond the two traffic groupings in the example described above (i.e., mission critical and lower value) to more groups. For example, the traffic groupings may include three groups including mission critical, high value and low value, with different trajectory configurations settings for each group.

Scenario 4: Differentiation of Control Traffic ModCod Between Terminals on a Shared Forward Channel In an example, a terminal may be operatively coupled to any of a gateway and/or a second terminal to receive and/or transmit, on the applied ModCod, system control messages therefrom/thereto. In an example, the applied ModCod may be modified based on the system control messages to be transmitted/received and required availability of service. For example, the gateway may transmit specific system control messages to terminals on forward channels, in addition to user data traffic.

These control messages might be destined to specific terminals, to groups of terminals, or to all terminals. The system control messages may be selected from at least one of system access information, return channel information, return channel bandwidth allocation, terminal configuration profile, shared configuration profile, terminal software image, handshake message, or diagnostic and status query. For example, the system access information may be addressed to all terminals and may pertain to at least one of system, satellite/carrier identification, timing, security key versions, or other associated aspects. The return channel information may pertain to return channel definitions, status and/or controls. The return channel bandwidth allocation may be commonly addressed to all terminals, with each terminal parsing common messages to find its own allocation. The terminal configuration profile, the handshake message, and the diagnostic and status query may be addressed to specific terminals, whereas the shared configuration profile and terminal software image may be addressed to selective or all terminals. In some examples, when ACM is utilized for a shared forward channel, a ModCod may be selected to convey such control messages. In an example, Table 1 depicts the possible categorization of specific control information and corresponding ModCod that may be used.

TABLE 1

| Control information type | ModCod used |
| --- | --- |
| System access information | High availability (e.g., QPSK ¼) |
| Return channel definitions and controls | High availability |
| Return channel bandwidth allocations - high availability terminals | High availability |
| Return channel bandwidth allocations - standard availability terminals | Standard availability (e.g., QPSK ½) |
| Configuration messages, protocol handshakes and diagnostic queries addressed to specific terminals | High availability or standard availability, depending on the specific terminal target service availability |
| Shared configuration profiles and terminal software images, addressed to many or all terminals | High availability (a choice for implementation simplicity, although differentiation by group of terminal might be possible. |

In some examples, the most robust (and least efficient) supported ModCod may be used for this purpose, particularly for messages destined to multiple terminals, so as to enable effective functioning of the terminal, which otherwise may be affected if specific control messages are not received. However, the control messages may take a significant amount of shared forward channel capacity. To allow optimization of the control channel capacity usage, the system and method described herein may send different shared control messages at different ModCods, depending on the terminal population intended to receive such messages. For example, in reference to table 400 (in FIG. 4), and assuming that Terminal 1 may be authorized to request QPSK ¼, and Terminal 2 may not be authorized to request QPSK ¼ but is authorized to use QPSK ½, specific information (control messages) may be destined to both terminals to be sent at QPSK ¼. In some examples, specific information may be partitioned into two messages, for example, one message intended for Terminal 1 sent at QPSK ¼, and another message intended for Terminal 2 sent at QPSK ½. In some examples, control messages that may be required to be received by high availability terminals may be sent using the most robust ModCod for which those terminals are authorized to use. In this example, the control messages that need only be received by standard availability terminals may be sent using the most robust ModCod for which those terminals are authorized to use. In this example, the control messages that are intended for both high and standard availability terminals may be sent using high availability based most robust ModCod. In this manner, the respective service plan of any terminal may be known to the gateway, or else may be understood based on ACM signaling sent by the terminal ACM control module. The above described implementation may enable to control capacity to be optimized while enabling sale of a higher availability differentiated grade of service.

Scenario 5: Automatic Manipulation of Forward Control Traffic ModCod Based on Utilization or Efficiency Thresholds In case a single common target terminal service availability may be desired, the conventional techniques may address by sizing equipment (gateway RFT, terminal antenna and power amplifier) to meet that availability on a probabilistic basis. However, it might be recognized that not all terminals receiving a shared forward channel may experience the same forward link conditions (as shown in FIG. 1B). Further, quality of the forward link may also be based on position of the antenna pertaining to a terminal. These variable conditions in a shared forward channel may not be possible to be considered based on conventional techniques. However, the system and method described herein may facilitate the gateway to dynamically change the control traffic ACM ModCod based on forward channel utilization. This may be performed to optimize traffic throughput capacity when congested, and to optimize availability when not congested. For example, in one situation, when a forward channel utilization may drop below a configured threshold value (for example 50%), the gateway may use a highly robust forward ACM ModCod (such as QPSK ¼) for control traffic. In another situation, for example, when the forward channel utilization may exceed a different configured threshold value (for example 75%), the gateway may use a less robust forward ACM ModCod (such as QPSK ½) for control traffic. In some examples, the terminals may be configured with a forward ACM trajectory table containing both QPSK ¼ and QPSK ½, along with other more efficient ModCod formats. The system and method described herein may also authorize a terminal to request a ModCod number no lower than the control message ModCod being received from the Gateway. For example, if gateway uses QPSK ¼, terminals can request QPSK ¼, and if the Gateway uses QPSK ½, terminals can request QPSK ½. This may lead to multiple advantages such as, terminal with improper positioning of antenna may receive the service if the capacity is being wasted. This may ensure that the system will not use inefficient coding when forward capacity is congested. Another advantage may include effective service in conditions such as rain attenuation when forward capacity is available. Additionally, this may also enable to handle a startup scenario when there is absence of/less traffic in a link that is transmitted in rainy conditions, wherein the system may initially use QPSK ¼ because of low (i.e., zero) current channel utilization, such that the gateway permits faded terminals to receive service. The utilization of different threshold values may enable/disable use of the highly robust ModCod for shared forward control traffic. This may also ensure that the system may not toggle back and forth due to the different overhead for control traffic encoding. In an alternate example, the system may consider an average forward channel ModCod efficiency rather than the forward channel utilization, to determine whether to enable use of the highly robust ModCod for controlling traffic. For example, when most terminals sharing the forward channel may have changed to a robust ModCod such as QPSK ½, the system may assume that few terminals may have already faded and might benefit from using QPSK ¼, assuming that most of the shared forward channel is subjected to bad weather conditions/rain. In this case, the gateway may switch to QPSK ¼ for forward control traffic, with terminals requiring that ModCod being able to request it for forward user data traffic as well. It should be appreciated that the above discussed scenario may be based on assumption that the terminal may have sufficient return margin (for example, a powerful enough radio amplifier) to operate the return channel while the forward channel requires robust ModCod such as QPSK ¼.

Figure 7:
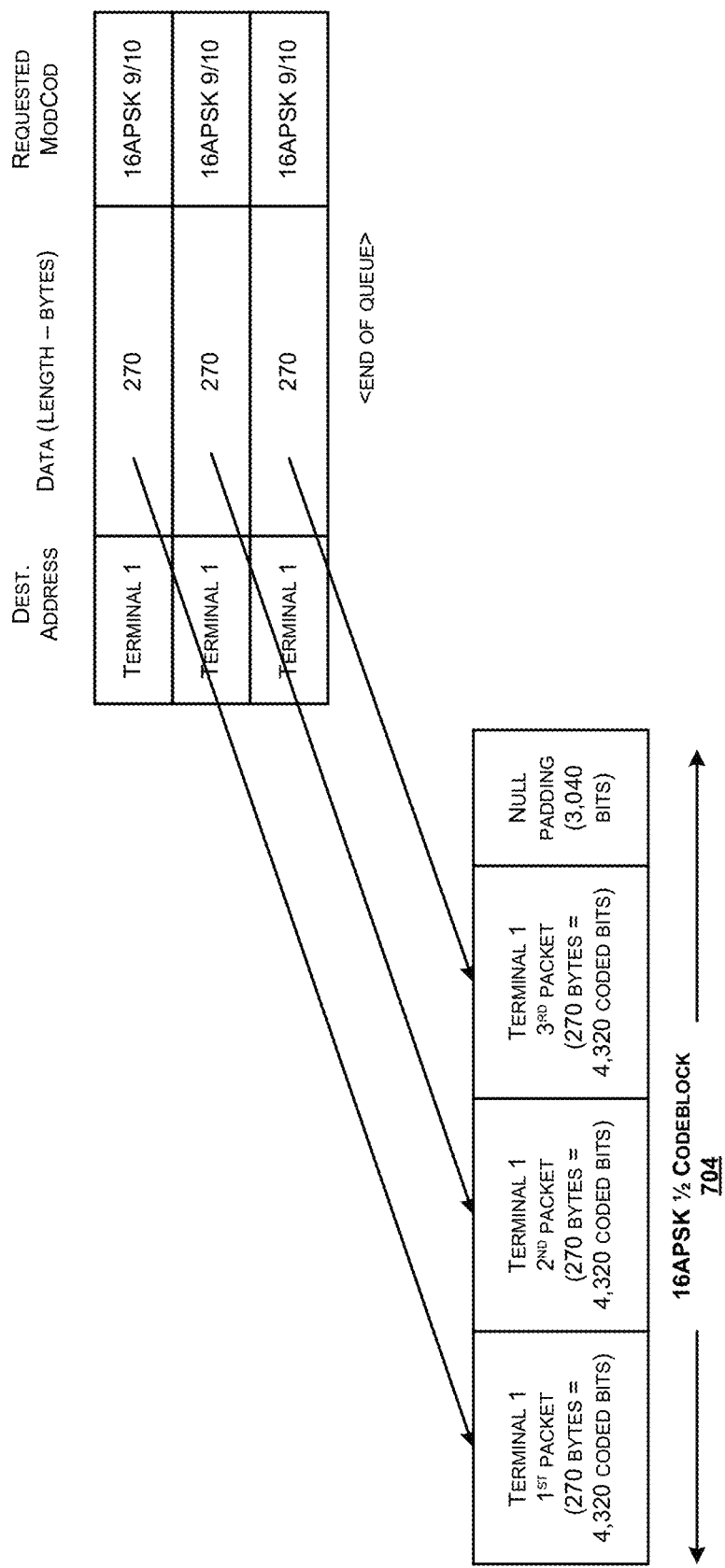
FIG. 7 illustrates a block diagram of ModCod downgrade for an uncongested forward channel, according to an example.

Scenario 6: Opportunistic Downgrade to a More Robust Forward ModCod when Capacity is Available, to Minimize BER In an example, wherein there may be insufficient queued traffic to fill a codeblock using the requested ModCod for a forward traffic function, the system and method described herein may opportunistically downgrade the codeblock under construction to a more robust and less efficient ModCod, provided the queued traffic may not exceed the codeblock capacity. This operation may enable efficient capacity utilization because it trades null padding of unused space in the codeblock for more FEC coding of user traffic. This may provide higher coding protection and therefore a lower average BER. Thus, the BER may be optimized even beyond the target BER average with no efficiency penalty. FIG. 7 illustrates a block diagram of ModCod downgrade for an uncongested forward channel, according to an example. As shown in 702 in FIG. 7, three 270 byte packets may be queued for transmission to terminal 1. The terminal 1 may have requested a ModCod of 16APSK 9/10 (10 coded bits used to deliver 9 data bits, modulated at 16APSK). Assuming, if the gateway encodes the terminal 1 queued data using 16APSK 9/10, the three queued packets may occupy 7,200 bits of the 16,000 bit codeblock (assuming each 270-byte packet may take 2,400 bits) and the remaining 8,800 bits may be null padded (and wasted). However, as shown in 704, the system and method described herein may use the opportunistic downgrade concept, wherein the gateway may instead encode the packets using rate ½ FEC (for example, 16APSK ½). In this case, the three queued packets may occupy 12,960 bits of the 16,000 bit codeblock (assuming each 270-byte packet may occupy 4,320 bits), and the remaining 3,040 bits may be null padded (and wasted). Thus, as observed in this example, the same traffic may be delivered with more robust coding and less waste. It should be appreciated that an FEC rate downgrade may not be limited to these examples and other techniques pertaining to opportunistic downgrade may also be applicable. Further, it may be further appreciated that the above mentioned concept may be applied to a dedicated channel using ACM. This may include, for example a point-to-point DVB-S2 TDM carrier to and/or from a terminal. In some examples, if there may be an insufficient traffic queued to the destination, the ModCod indicated by the trajectory table and current link quality metric may be downgraded to a more robust ModCod for a given codeblock transmission. This may enable to optimize the error rate with no capacity loss or traffic performance degradation. In some examples, the system may avoid unnecessary return channel signaling to request a ModCod change. For example, in a scenario in which a terminal 1 may have requested the gateway to use ModCod 16APSK 9/10 for forward traffic. In times of low traffic, the system may opportunistically downgrade the delivery ModCod, for example to QPSK 9/10. In such cases, upon receiving QPSK 9/10 codeblocks, it may be undesirable for the terminal 1 to repeatedly request gateway to use 16APSK 9/10, thereby wasting return channel capacity. To address this possible concern, the system and method may enable flagging an opportunistic ModCod downgrade in some forward channel header. In an alternate solution, the system may allow a terminal to repeat a ModCod request only after receiving some configured number of successive downgraded ModCod codeblocks. In some examples, a satellite system operator may desire to allow only an aggregate forward channel capacity to an enterprise or virtual network operator (VNO) to be reserved for and shared by its collection of terminals. In such examples, if capacity commitment may be expressed in units of user traffic bits (or traffic plus terminal signaling bits), then the opportunistic ModCod downgrade may have no effect on the amount of traffic the user can send. However, if the capacity commitment is expressed in units of symbols, then the opportunistic ModCod downgrade may cause more symbols to be occupied for the same amount of traffic, or may cause the user traffic to be capped at a lower rate when the system is uncongested. To address these concerns, the system may enable to account symbol usage for capacity contract fulfillment purposes according to the requested ModCods rather than the utilized ModCods.

Scenario 7: Opportunistic Downgrade to a More Robust TDMA Return ModCod when Capacity is Available, to Minimize BER In an example, the system may downgrade time division multiple access (TDMA) return ModCod for a terminal when capacity is available so as to minimize the BER. The term TDMA channel may pertain to a sequence of frames, each of a fixed time duration. For example, a 45 millisecond return TDMA frame duration may be used in the IP over Satellite (IPoS) standard. Each TDMA frame may be further divided into a number of fixed size time slots, for example, a frame may include 24 time slots. This reliance on time based sharing requires that terminals should be time synchronized so that their transmissions do not overlap. This enables multiple terminals to transmit during different time slots of the same frame. The gateway responsible to allocate TDMA return channel bandwidth may commonly take account of the queued backlog for each terminal, either signaled in bandwidth requests on contention channels, or piggybacked onto the data sent in using TDMA return channel allocation. Using the backlog information received from terminals sharing a given return bandwidth pool, the gateway may allocate a number of transmit slots on a given return channel frequency to a given terminal. In an example, when the system implements return channel ACM, with the terminal dynamically adapting its transmit modulation, coding, or both based on link quality metrics relayed from the gateway, the gateway bandwidth allocation function may use the ModCod indication for each given terminal to determine how many TDMA channel transmit slots to allocate to that terminal to match its backlog. In an example, when the system has more capacity available than the aggregate of terminal backlog signaled, the gateway may commonly allocate extra bandwidth to each or to many terminals, to be used opportunistically in event additional traffic is queued before the allocated transmit time arrives. Thus, a terminal might be allocated more return bandwidth than it has traffic queued to send. The conventional solution may cause the terminal to null pad corresponding return transmission, and/or to transmit null bursts, so that the gateway demodulator can remain locked to the inroute, so the system can differentiate between a lost burst and an unneeded return capacity allocation. However, the system and method described herein enable to opportunistically downgrade a given return channel transmission to a more robust ModCod when excess capacity allocation is available, similarly to the opportunistic forward ModCod downgrade as has been described in the previous scenario. In particular, the ACM control module of the terminal may determine the optimal ModCod to be used for return channel transmission, independent of the volume of data queued and the amount of return capacity allocated. In this case, when an allocated transmission opportunity arrives, if the terminal has sufficient return traffic queued to fill the allocated capacity at the optimal ModCod, the system may apply the optimal ModCod. However, if the terminal has received greater capacity allocation than the queued data may occupy at the optimal ModCod, the terminal may opportunistically downgrade the transmit ModCod for the particular transmit opportunity, to the most robust ModCod format for which the queued traffic may fit into the allocated number of time slots. This operation transports return channel traffic more robustly without wasting capacity that could otherwise be used, and without any degradation of the performance of the transported traffic.

Scenario 8: Automatic Manipulation of ModCod for a Given Multicast Stream Based on Capacity Threshold In an example, the system may change the applied ModCod for a given multicast data delivery stream based on capacity threshold pertaining to utilization of bandwidth. Satellite systems may be suited to efficiently deliver multicast traffic to many terminals, for services such as, for example, video broadcast, distance learning, video conferencing, digital signage, and other applications. The system and method described herein may enable adaptive multicast delivery such that rather than configuring a minimum permitted ModCod for a given multicast stream, utilization/ModCod pairs may be configured. For example, for an uncongested forward channel, say below 50% utilization, a lower value/lower cost multicast stream may be permitted to adapt down to QPSK ½. However, when utilization may exceed another threshold, for example 70%, the same multicast stream may be constrained to avoid adapting below 8PSK ½. Similarly, for another even higher threshold value, say 85%, the same multicast stream may be constrained to avoid adapting below 8PSK ⅔. This operation enables the system operator to enable a service level that makes use of unused capacity without having low value multicast traffic be formatted with a ModCod that can excessively displace other forward traffic.

Figure 8:
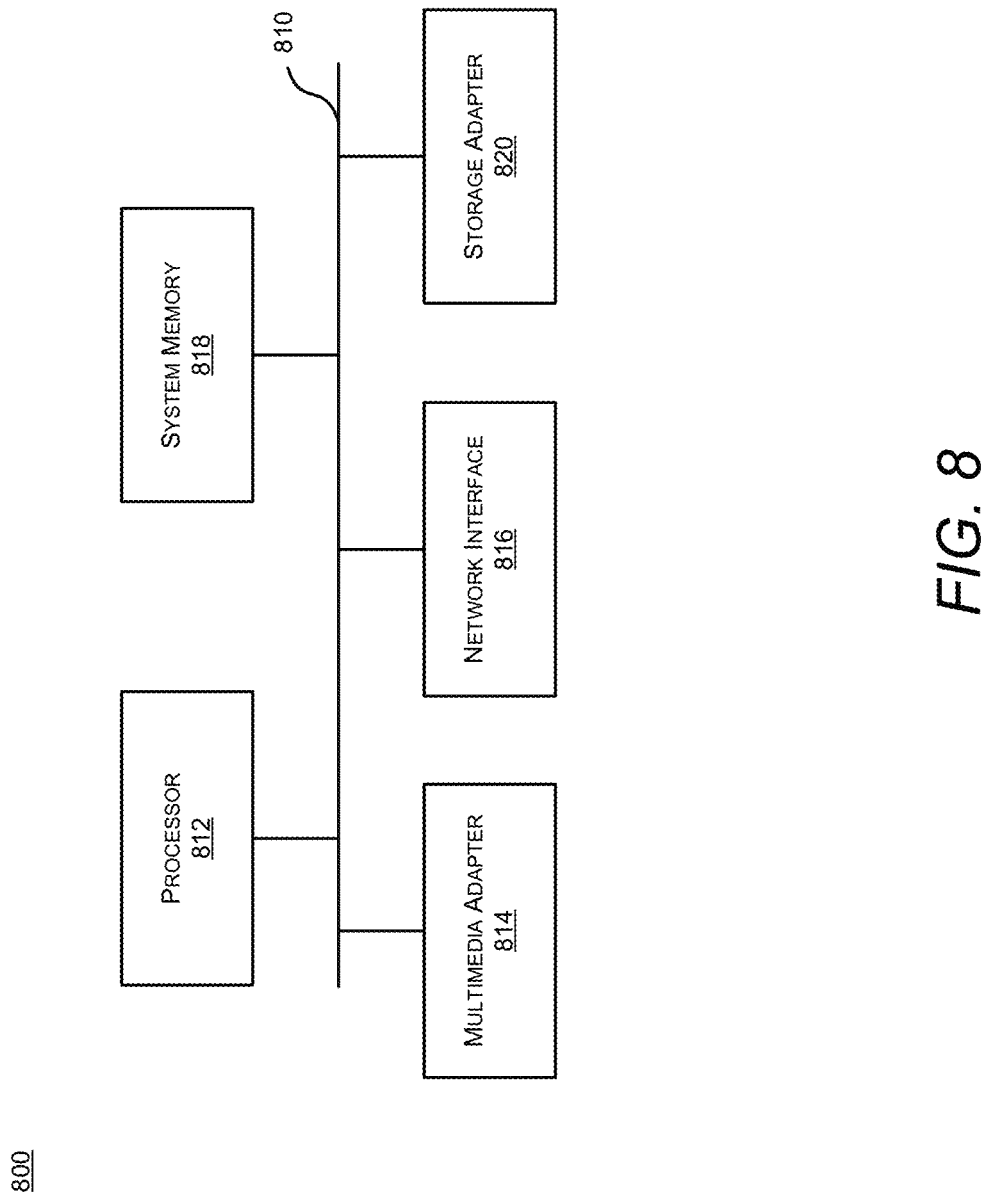
FIG. 8 illustrates a block diagram of a computer system for differentiating application of ACM to enhance link performance, according to an example.

FIG. 8 illustrates a block diagram of a computer system for differentiating application of ACM to enhance link performance, according to an example. The computer system 800 may be part of or any one of the terminals 110, the gateway 130, the network data center 140, the network management system (NMS) 150, the business system 160, as shown in system 100-1 and/or 200 to perform the functions and features described herein. The computer system 800 may include, among other things, an interconnect 810, a processor 812, a multimedia adapter 814, a network interface 816, a system memory 818, and a storage adapter 820.

The interconnect 810 may interconnect various subsystems, elements, and/or components of the computer system 800. As shown, the interconnect 810 may be an abstraction that may represent any one or more separate physical buses, point-to-point connections, or both, connected by appropriate bridges, adapters, or controllers. In some examples, the interconnect 810 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 810 may allow data communication between the processor 812 and system memory 818, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 812 may be the central processing unit (CPU) of the computing device and may control overall operation of the computing device. In some examples, the processor 812 may accomplish this by executing software or firmware stored in system memory 818 or other data via the storage adapter 820. The processor 812 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 814 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 816 may provide the computing device with an ability to communicate with a variety of remove devices over a network (e.g., private network 170 or public network 180 of FIG. 1) and may include, for example, an Ethernet adapter, a Fibre Channel adapter, and/or other wired- or wireless-enabled adapter. The network interface 816 may provide a direct or indirect connection from one network element to another, and facilitate communication and between various network elements.

The storage adapter 820 may connect to a standard computer-readable medium for storage and/or retrieval of information, such as a fixed disk drive (internal or external).

Many other devices, components, elements, or subsystems (not shown) may be connected in a similar manner to the interconnect 810 or via a network (e.g., private network 170 or public network 180 of FIG. 1). Conversely, all of the devices shown in FIG. 8 need not be present to practice the systems and methods described herein. The devices and subsystems can be interconnected in different ways from that shown in FIG. 8. Code or computer-readable instructions to implement the dynamic approaches for payment gateway selection and payment transaction processing of the system 800 may be stored in computer-readable storage media such as one or more of system memory 818 or other storage. Code or computer-readable instructions to implement the dynamic approaches for payment gateway selection and payment transaction processing of the system 800 may also be received via one or more interfaces and stored in memory. The operating system provided on computer system 800 may be MS-DOS®, MS-WINDOWS®, OS/2®, OS X®, IOS®, ANDROID®, UNIX®, Linux®, or another operating system.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for differentiating application of ACM to enhance link performance in satellite communication systems.

It should be appreciated that the systems and methods described herein may facilitate to enhance link performance in satellite systems. It should also be appreciated that the systems and methods, as described herein, may also include or communicate with other components not shown. For example, these may include external processors, counters, analyzers, computing devices, and other measuring devices or systems.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as transponded satellite systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

By leveraging existing customer terminals, the system and methods described herein may provide efficient processing techniques and a cost-effective approach that may be readily integrated into various and existing network equipment. The systems and methods described herein may provide mechanical simplicity and adaptability to small or large satellite communication systems. Ultimately, the systems and methods described herein may increase efficiency, reduce cost, maximize existing equipment, minimize adverse effects of traditional systems, and improve link performance.

What has been described and illustrated herein are examples of the systems and methods along with some variations. The terms, descriptions, and figures used herein are set forth by way of illustration only and are not meant as limitations. Many variations are possible within the scope of the systems and methods described herein, which are intended to be defined by the following claims—and their equivalents—in which all terms are meant in their broadest reasonable sense unless otherwise indicated.

The invention claimed is:

1. A system comprising:
   a processor; and
   a memory operatively coupled with the processor and comprising a set of instructions, which when executed, cause the processor to:
   dynamically compute bandwidth capacity of a terminal from a plurality of terminals; and
   automatically determine, based on the computed bandwidth capacity of the terminal and using an Adaptive Coding and Modulation (ACM) technique, a Modulation and Coding combination (ModCod) to be applied for transmission to or from the terminal to optimize bit error rate (BER) performance, wherein the system, for a codeblock transmission, downgrades the applied ModCod by changing an encoding pattern of packets in the codeblock when forward channel capacity is available to minimize the BER to optimize the BER performance.

2. The system of claim 1, wherein the processor, for the plurality of terminals, dynamically determines aggregate bandwidth availability and congestion within the ACM technique to optimize sharing of available bandwidth.

3. The system of claim 1, wherein the system is a dynamic link adaptation system.

4. The system of claim 1, wherein the ACM technique uses a trajectory table to adaptively change or allow permission for use of the applied ModCod by the terminal.

5. The system of claim 4, wherein configuration of the trajectory table is altered based on at least one of capacity utilization or expected congestion during a day.

6. The system of claim 4, wherein the trajectory table authorizes use of a given ModCod format for a defined traffic class of service for the terminal.

7. The system of claim 1, wherein the applied ModCod is changed for the terminal based on any or a combination of parameters associated with at least one of satellite link, congestion, weather, availability of a service level to be provided to the terminal, terminal radio power, or antenna size.

8. The system of claim 1, wherein the applied ModCod is changed based on monitoring and periodic comparison of shared forward channel aggregate utilization with a pre-defined threshold, wherein the change comprises downgrading the ModCod when the shared forward channel aggregate utilization is less than the pre-defined threshold.

9. The system of claim 1, wherein the terminal is differentiated from a second terminal based on any or a combination of congestion parameters, and availability of a service level defined for the respective terminals.

10. The system of claim 1, wherein the terminal is operatively coupled to any of a gateway or a second terminal to receive or transmit, on the applied ModCod, system control messages therefrom/thereto, wherein the system control messages are selected from at least one of system access information, return channel information, return channel bandwidth allocation, terminal configuration profile, shared configuration profile, terminal software image, handshake message, or diagnostic and status query, and wherein the applied ModCod is modified based on the system control messages to be transmitted/received and required availability of service.

11. The system of claim 10, wherein the gateway dynamically changes ModCod for transmitting control traffic based on forward channel utilization to optimize traffic throughput capacity when congested, and to optimize availability when not congested.

12. The system of claim 1, wherein the system is implemented in a gateway device.

13. The system of claim 1, wherein the system downgrades TDMA return ModCod for the terminal when capacity is available so as to minimize the BER to optimize the BER performance, the downgrading being performed based on at least one of a number of TDMA channel transmit slots to be allocated, a backlog at the terminal, or a most robust ModCod that conveys the backlog in that number of slots.

14. A method comprising:
   dynamically computing, at a network device, bandwidth capacity of a terminal from a plurality of terminals; and automatically determining, at the network device, based on the computed bandwidth capacity of the terminal and using an Adaptive Coding and Modulation (ACM) technique, Modulation and Coding combination (ModCod) to be applied for transmission to or from the terminal to enable optimized bit error rate (BER) performance, wherein, for a codeblock transmission, the applied ModCod is downgraded by changing an encoding pattern of packets in the codeblock when forward channel capacity is available to minimize the BER to optimize the BER performance.

15. The method of claim 14, wherein the network device is a gateway.

16. The method of claim 14, wherein the network device, for the plurality of terminals, dynamically determines aggregate bandwidth availability and congestion within the ACM technique to optimize sharing of available bandwidth.

17. The method of claim 14, wherein the ACM technique uses a trajectory table to adaptively change or allow permission for use of the applied ModCod by the terminal.

18. A non-transitory computer-readable storage medium having an executable computer instructions stored thereon, which when executed instructs a processor to perform a method as follows:
dynamically computing, at a network device, bandwidth capacity of a terminal from a plurality of terminals; and
automatically determining, at the network device, based on the computed bandwidth capacity of the terminal and using an Adaptive Coding and Modulation (ACM) technique, Modulation and Coding combination (ModCod) to be applied for transmission to or from the terminal to optimize bit error rate (BER) performance, wherein the processor, for a codeblock transmission, downgrades the applied ModCod by changing an encoding pattern of packets in the codeblock when forward channel capacity is available to minimize the BER to optimize the BER performance.

19. The system of claim 1, wherein the system changes the applied ModCod for a given multicast data delivery stream based on capacity threshold pertaining to utilization of bandwidth.

* * * * *